United States Patent [19]

Hikita et al.

[11] Patent Number: 4,821,175
[45] Date of Patent: Apr. 11, 1989

[54] DATABASE PROCESSING DEVICE

[75] Inventors: Sadayuki Hikita; Suguru Kawakami; Hiromi Haniuda; Akifumi Sakamoto; Hideki Yamamoto, all of Tokyo, Japan

[73] Assignee: Oki Electric Industry Co., Ltd., Tokyo, Japan

[21] Appl. No.: 813,077

[22] Filed: Dec. 24, 1985

[51] Int. Cl.⁴ ............................................. G06F 15/40
[52] U.S. Cl. .................................................... 364/200
[58] Field of Search ..................... 364/200 MS File

[56] References Cited
U.S. PATENT DOCUMENTS 4,096,561 6/1978 Trinchieri ........................... 364/200
4,224,664 9/1980 Trinchieri ........................... 364/200
4,648,036 3/1987 Gallant ................................. 364/300

OTHER PUBLICATIONS

C. J. Date, An Introduction to Database Systems, vol. I, Sections 3.1-3.2, 1.1.
C. J. Date, An Introduction to Database Systems, vol. II, Sections 3.2 and 3.6.

Primary Examiner—Gareth D. Shaw
Assistant Examiner—Adolfo Ruiz
Attorney, Agent, or Firm—Wenderoth, Lind & Ponack

[57] ABSTRACT

A database processing device executes concurrent processing in accessing a database through a plurality of independent terminal units. The database processing device, upon updating data stored in a record after reading out the data stored in the record in the database and correcting or altering the data through a specific terminal, confirms whether or not the data stored in the record has been updated by terminals, and executes updating only when the data has not been updated. The data stored in the record includes update control information for confirming whether or not the data has been updated by other terminals.

4 Claims, 16 Drawing Sheets

| RECEIVED DATA IS DELIVERED TO RETRIEVAL MEANS 15 | ~50 |

↓

| DATA RECEIVED FROM RETRIEVAL MEANS 15 IS DELIVERED TO TRANSMISSION MEANS AS PROCESSING RESULT | ~51 |

| RECEIVED DATA IS DELIVERED TO RETRIEVAL MEANS 15 WHILE HOLDING IT | ~52 |

↓

| DATA RECEIVED FROM RETRIEVAL MEANS 15 AND DATA HELD IN STEP 52 ARE DELIVERED CONCURRENT EXECUTION CONTROL MEANS 17 | ~53 |

↓

| DATA RECEIVED FROM CONCURRENT EXECUTION CONTROL MEANS 17 IS DELIVERED TO UPDATING MEANS 18 | ~54 |

↓

| DATA RECEIVED FROM UPDATE MEANS 18 IS DELIVERED TO TRANSMISSION MEANS 12 AS PROCESSING RESULT | ~55 |

↓
⑤

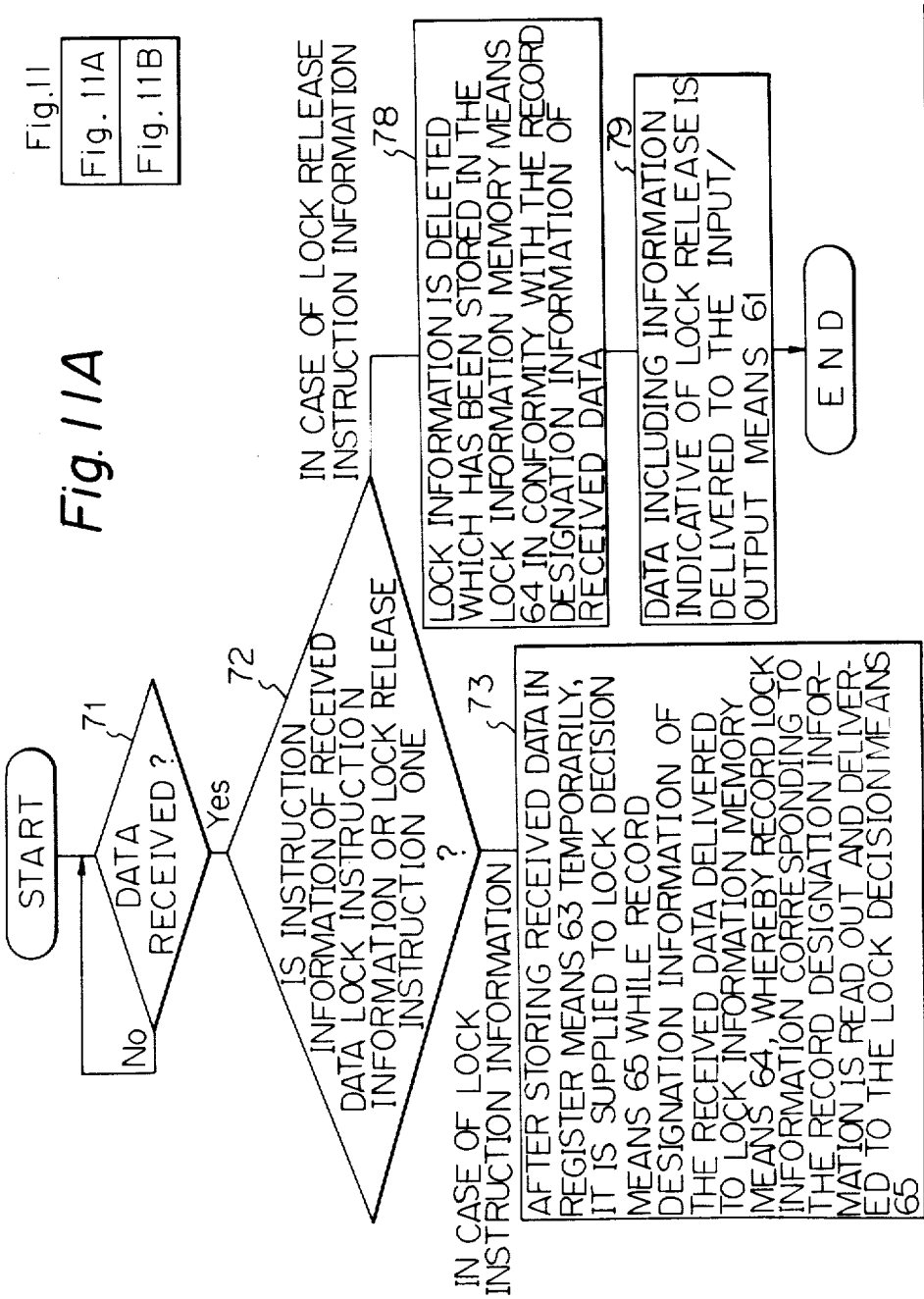

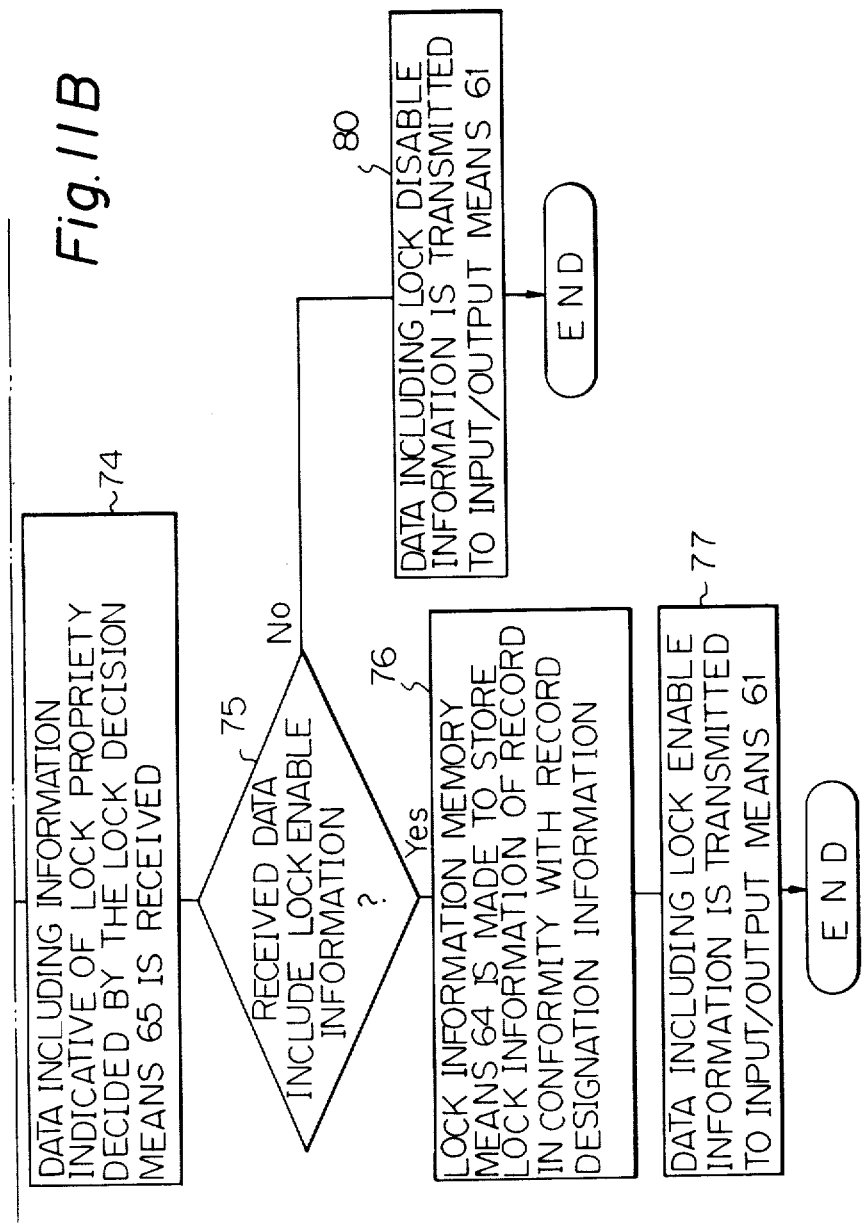

DATABASE PROCESSING DEVICE

BACKGROUND OF THE INVENTION

1. Field of the Invention

The present invention relates to a device for concurrently executing processings on a database.

2. Description of the Prior Art

Allowing a plurality of independent terminals to freely process records in a database device, for example, independent terminals 1, 2, as illustrated in a schematic of a processing procedure of FIG. 1, may concurrently process data stored in the same record A in the database system. As exemplified in FIG. 1, after the terminal 1 reads data out of a database system 3, the terminal 2 reads out the same data in the record A from the database system 3, corrects the data, and writes it in the same record A of the database so as to update it. Thereafter, the terminal 1 successively updates the contents of the record A. In this instance, a problem may be produced that the updating by the terminal 2 is invalid due to the updating by the terminal 1.

A method to solve the difficulty is disclosed in "The Systems Programing Series Volume II An Introduction to Database Systems" by C. J. Date, published by Addison-Wesley pp 83–119.

A general example to solve the problem will be described with reference to a processing procedure shown in FIG. 2.

A database system 3 has a data locking mechanism which supervises access from a terminal in a unit of record in a database or a unit of a file constituting a plurality of records, which executes shared mode locking and exclusive mode locking. The shared mode locking is set as a certain terminal retrieves data from the database system, i.e. reads out the data. Furthermore, the shared mode locking allows other terminals to execute only retrieval processing on the same record or the same file, and rejects the execution of updating. The exclusive mode locking is set as a certain terminal updates data in the database and rejects execution of retrieving and updating on the same record or file by other terminals.

As shown in FIG. 2, the terminal 1 requests that the database system 3, upon executing retrieval processing, lock a processing object record in a shared mode. The database system 3 confirms whether or not the processing object record has been locked in the exclusive mode by the other terminal, and if not locked, allows the terminal 1 to lock the record; after the terminal 1 locks the concerned record in the shared mode, it delivers data stored in the concerned record to the terminal 1. The terminal 1, which has received the data, corrects and alters the data, and when execution of updating of the record in the database system 3 is needed, requests the database system 3 to lock the processing object record in the exclusive mode. The database system 3, so requested, allows the terminal 1 to lock the record under the condition that the record has not been locked by the other terminal in either the shared or the exclusive modes. The terminal 1, whose locking operation is allowed, delivers the corrected and altered data to the database system 3 and updates the data, and thereafter requests the database system 3 to unlock the record. The database system 3, subjected to the unlocking request, unlocks the record. However, the device which concurrently executes database processing is designed on the assumption that updated data is clarified from the beginning of the processing and the device is profitably employed for routine works where each processing is completed in a short period of time. Against this, applying the device to nonroutine works where the device interactively has access to the database, data updating is determined at need after the data is read out of the database. Accordingly, the time required for locking the record being an object of the database in the shared mode is lengthened, whereby the device suffers from the fact that updating by the other terminal is disturbed and concurrency of the processing is lowered.

SUMMARY OF THE INVENTION

It is an object of the present invention to provide a database processing device improving concurrency of processings in a database system.

According to the present invention, a database processing device for receiving data, including instruction information and record designation information, from a plurality of independent terminal units and concurrently executing processing for data stored in the record designated by the database record designation information, comprises: a transmission means; a database control means; a retrieval means; an update means; and, a concurrent execution control means. The transmission means is for receiving and/or delivering information from and/or to the terminals. The database control means is for receiving the data from the transmission means, controlling the execution of processing in conformity with the instruction information of the data and providing processed data to the transmission means. The retrieval means is for retrieving the record designated by the record designation information included in the received data, and delivering data stored in the record, including update control information of the record. The update means is for updating the data stored in the record designated by the record designation information of the received data. The update means updates the value of the record itself and the update control information stored in the record. The data accessed by the retrieval means and the updating means is adapted to have a plurality of records each carrying data stored therein. The concurrent execution control means receives the update control information data included in the recorded subjected to the updating by the update means and the update control information data included in the update request received by the record update means. It then compares the update control information of both sets of data. If the update control information included in both sets of data matches, the concurrent execution control means delivers the data having the update control information. If the update control information of both sets of data does not match, the concurrent execution control means delivers data indicating a delete of the update. The update means, upon receiving the delete indication, executes the update delete and delivers data including information indicative of completion of the update delete. The database control means transmits the data received from the transmission means to the retrieval means when the instruction information included in the data is retrieval instruction information and provides data received from the retrieval means as a processed result. Furthermore, the database control means delivers the data received from the transmission means to the retrieval means when the instruction information of the data is an update instruction information and delivers this data received from the retrieval means and that data received from the transmission means that the concurrent execution means, while transmitting the data received from the concurrent execution control means to the update means and employing the data received from the update means as processed data.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

The advantages of the configuration of the invention become more apparent upon reading the accompanying detailed description in conjunction with the figures in which:

FIG. 11 (consisting of FIGS. 11A and 11B) is a flow chart illustrating a control procedure by a control means of the lock means;

DESCRIPTION OF THE PREFERRED EMBODIMENT

Figure 1:
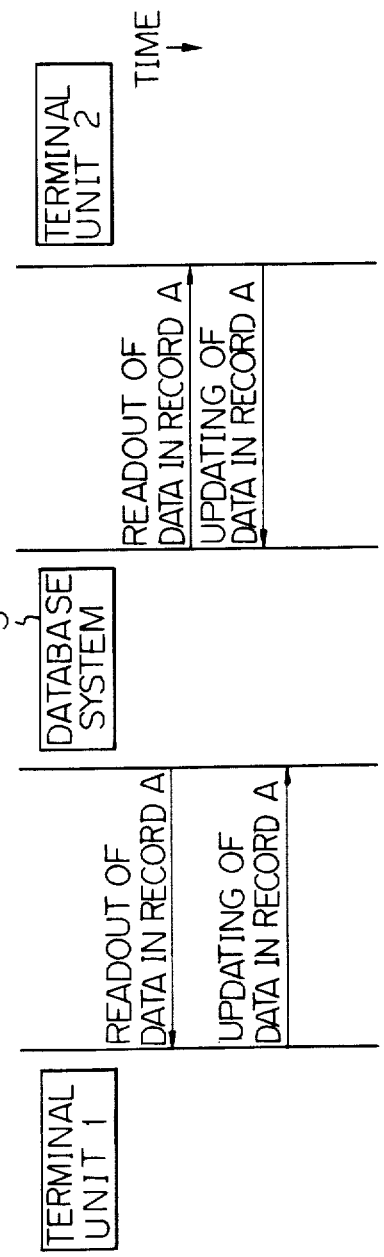
FIGS. 1 and 2 are schematics respectively illustrating a processing procedure in a prior database system.
Figure 2:
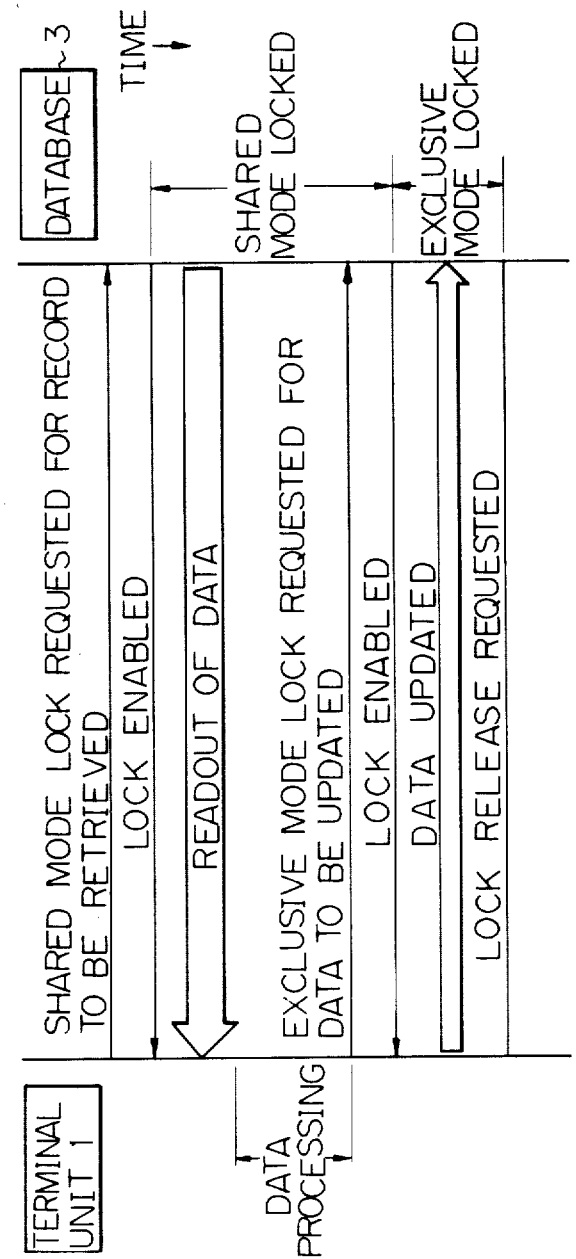
Figure 3:
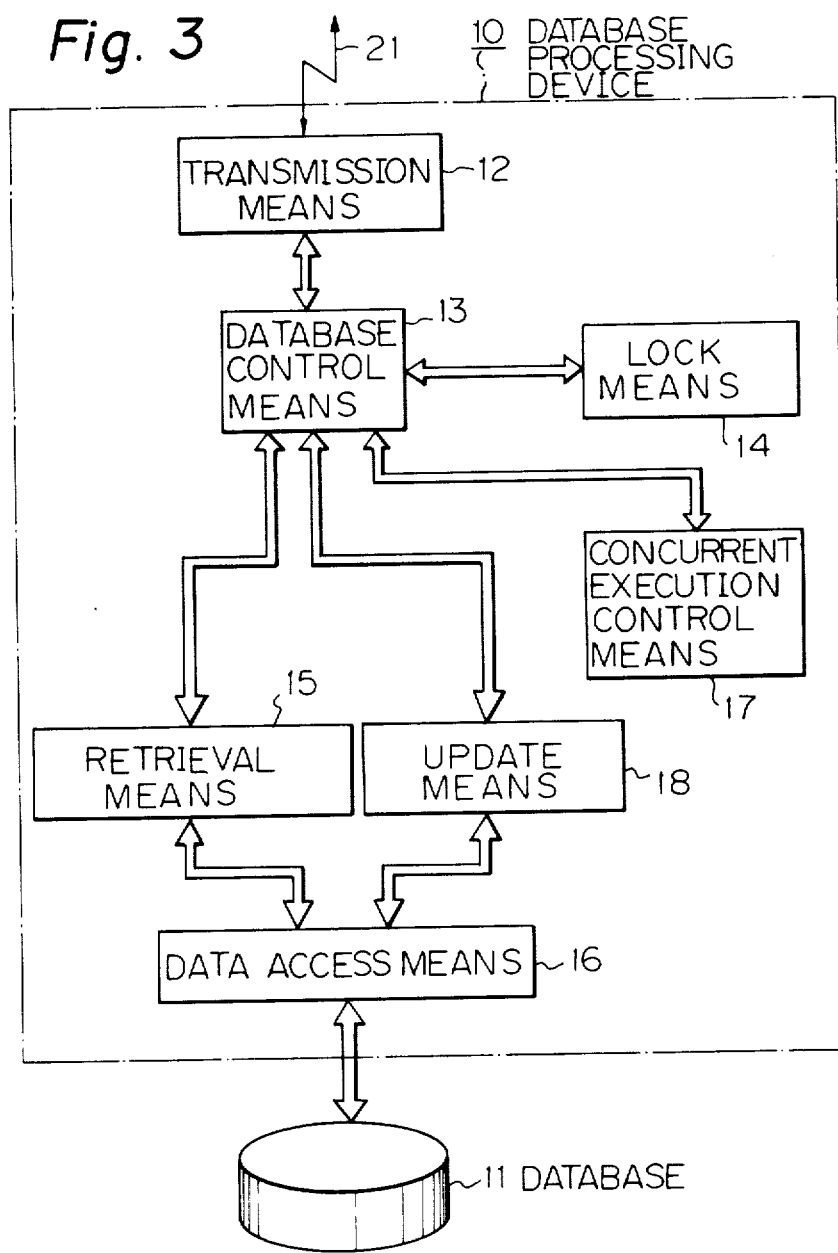
FIG. 3 is a block diagram illustrating the whole arrangement of a database processing device according to the present invention.

As shown in FIG. 3, a database processing device 10 according to the present invention receives data including instruction information and record designation information from a plurality of independent terminal units, accesses a database 11 to execute processing in conformity with the instruction information, and delivers processed results to a corresponding terminal unit. Transmission means 12 transmits and/or receives data to and/or from the plurality of the independent terminal units (not shown) via a transmission line 21. Database control means 13 receives data from the transmission means 12, controls execution of processing in conformity with instruction information included in the received data, and provides the processed data to the transmission means 12. Lock means 14, as the database control means 12 receives data carrying lock instruction information, receives the data, and decides the propriety of locking a record designated by record designation information. The lock means, if the locking is allowed, stores the fact that the record has been locked, and delivers data carrying lock enable information to the database control means 13. The lock instruction information serves to instruct the record in the database to be locked in two kinds of modes, i.e., a shared mode for executing retrieval processing and an exclusive mode for executing update processing.

Thus, the lock means 14 enables any record locked by a certain terminal in the shared mode to be locked by other terminals in the shared mode, whereas it disables it in the exclusive mode, and furthermore disables any record locked in the exclusive mode from being locked in either the shared or the exclusive mode. Retrieval means 15 receives data from the database control means 13 and forces database access means 16 to access to some record in the database 11 designated by record designation information included in the received data and to read out data stored in the record, and thereafter delivers the readout data to the database control means 13.

Figure 4:
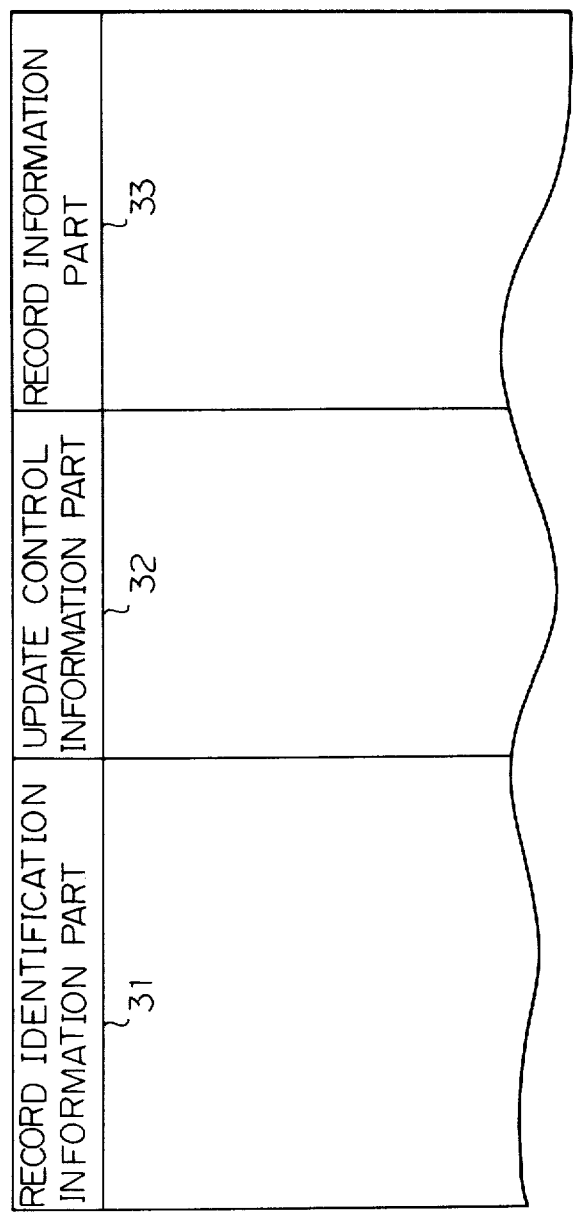
FIG. 4 is a view showing a recorded format of a database for use in the present invention.

The database 11 stores data in record configuration shown in FIG. 4. The record comprises a record identification information part 31, an update control information part 32, and a record information part 33. The record identification information part 31 stores information for uniquely identifying the record; the update control information part 32 stores update control information indicative of record update hysteresis, and the record information part 33 stores information updated and retrieved by the terminal units. When the database 11 is accessed by the retrieval means 15 or the update means 18 via the data access means 16, the record information part 33 and the update control information part 32 are accessed as data for transmission and/or reception. Concurrent execution control means 17 receives data to be updated and data stored in a record designated by record designation information included in the data from the database control means 13, and compares update control information included in both data. The concurrent execution control means 17 further updates the update control information included in the data to be updated when the update control information in both data match, and thereafter delivers the data whose update control information has been updated to the database control means 13, and it delivers data including information indicative of update cancellation to the database control means 13 when the update control information in both data do not match.

The update means 18, upon receiving from the database means 13 the data including the update control information already updated, drives the data access means 16 to access some record in the database 11 designated by record designation information in the received data and to update the data, and thereafter delivers data including information indicative of the completion of the updating to the database control means 13. The update means 18 further, upon receiving data including information indicative of update cancellation drives the data access means 16 to cancel a series of update processings on the record in the database 11 processed by the terminal transmitting the received data, and thereafter delivers data including information indicative of the completion of the update cancellation to the database control means 13.

A processing procedure on the data received by the database control means 13 will be described below with reference to FIGS. 5 to 9.

Figure 5A:
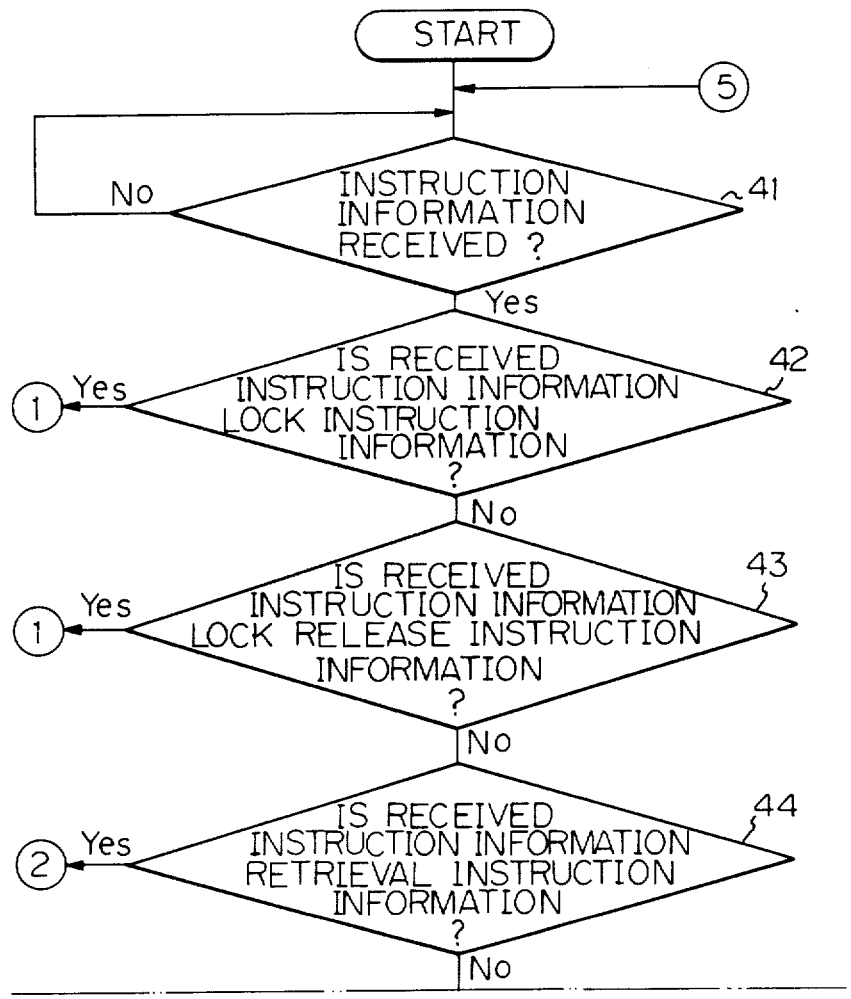
FIGS. 5 (consisting of FIGS. 5A and 5B), 6, 7, 8 and 9 are flow charts each showing control procedures a by database control means of the database processing device of the present invention.
Figure 5B:
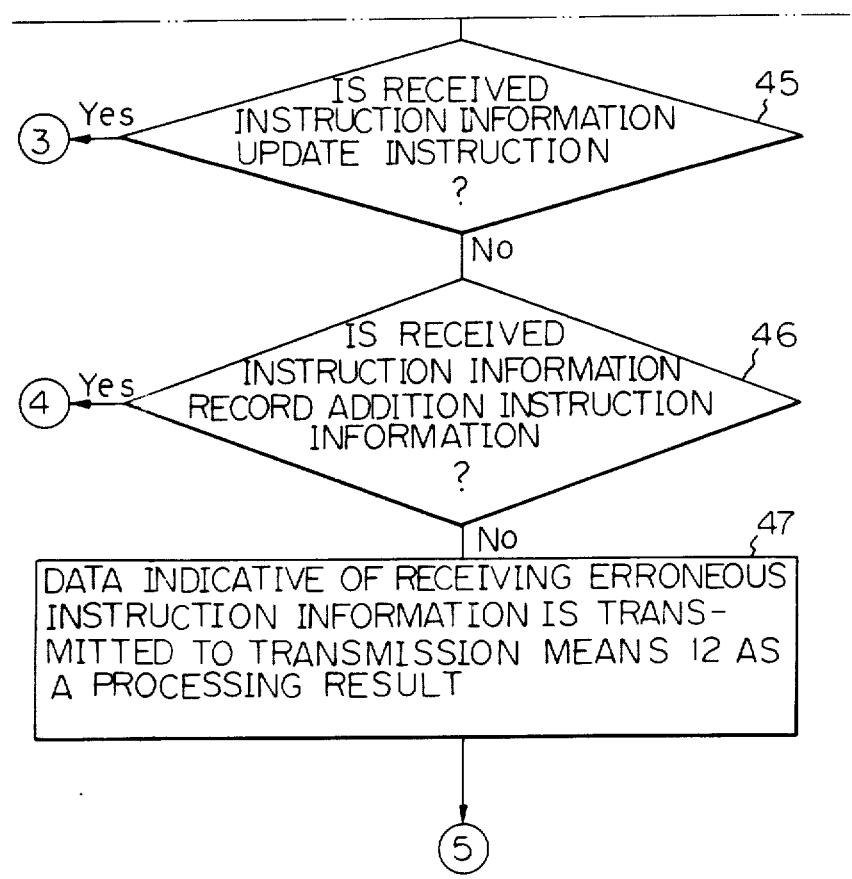

The database control means 13 supervises the received data as shown in FIG. 5, decides whether or not the transmission means has received instruction information in Step 41, and if received, goes forward to Step 42.

Figure 6:
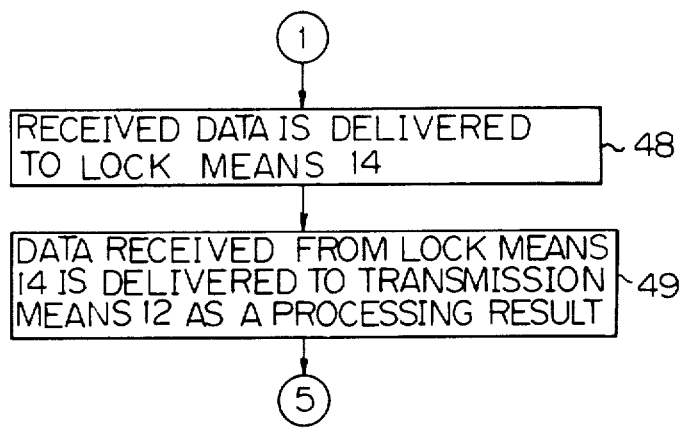

In Step 42, the database control means 13, if the received instruction information is lock instruction information, advances to Step 48 shown in FIG. 6, and otherwise advances to Step 43.

In Step 43, the database control means 13, if the received instruction information is unlock instruction information, goes forward to Step 48 shown in FIG. 6, and otherwise advances to Step 44.

In Step 44, if the received instruction information is retrieval instruction information, goes forward to Step 50 shown in FIG. 7, and otherwise advances to Step 45.

In Step 45, if the received instruction information is update instruction information, goes forward to Step 52 shown in FIG. 8, and otherwise advances to Step 46.

Figure 9:
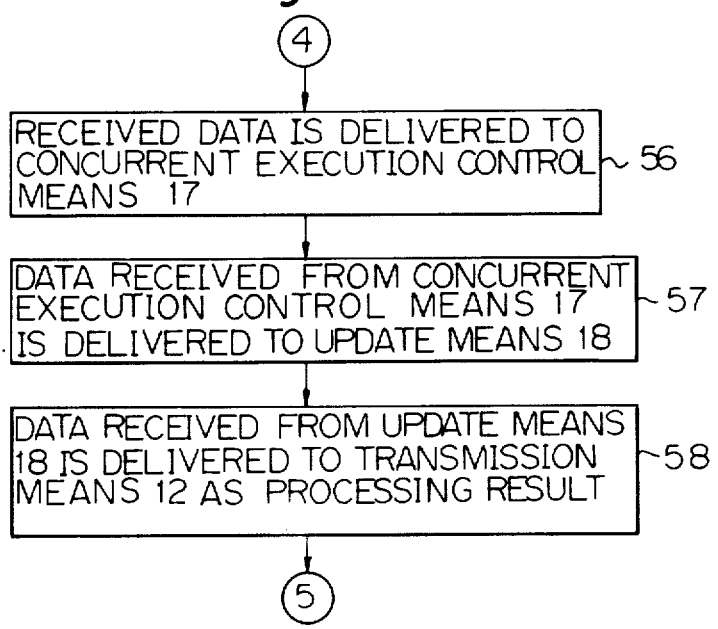

In Step 46, if the received instruction information is record addition instruction information, goes forward to Step 56 shown in FIG. 9, and otherwise advances to Step 47.

In Step 47, the database control means 13, after executing processing of transmitting data indicative of the fact that the received instruction information is in error, said data being transmitted to the transmission means 12 as a processing result, goes forward to Step 41 which is a waiting state for receiving instruction information.

In Step 48 shown in FIG. 6, the database control means 13 transmits the received data to the lock means 14. The lock means 14, after receiving the data, executes processing in conformity with the lock instruction information or lock release instruction information, and delivers data indicative of an execution result of the processing to the database control means 13. In Step 49, the database control means 13, after transferring the data received from the lock means 14 to the transmission means 12, goes foward to Step 41, which is the initial state.

In Step 50 shown in FIG. 7, the database control means 13 transfers the received data to the retrieval means 15. The retrieval means 15, after receiving the data, executes retrieval processing, and delivers data indicative of a processing result to the database control means 13. In Step 51, the database control means 13, after transferring the data received from the retrieval means, goes forward to Step 41 which is the initial state.

In step 52 shown in FIG. 8, the database control means 13 transfers the received data to the retrieval means 15, while temporarily holding the received data. In Step 53, it delivers the data temporarily held in Step 52 and the data received from the retrieval means to the concurrent execution control means 17. In Step 54, it transfers the data received from the concurrent execution control means 17 to the update means 18. In Step 55, it, after delivering the data received from the update means 18 to the transmission means 12 as a processing result, goes forward to Step 41, which is the initial state.

In Step 56 shown in FIG. 9, the database control means 13 transfers the received data to the concurrent execution control means 17. The concurrent execution control means, after receiving the data, prepares record identification information and update control information, and supplies data including both information to the database control means 13. In Step 57, the database control means transfers the data received from the concurrent execution control means 17 to the update means 18. The update means 18 drives the data access means 16 to store the record identification information and update control information involved in the received data in the record identification information part 31 and update control information part 32 of a record to be added in the database 11, for thereby executing the addition of the record, and further delivers data indicative of the completion of the record addition to the database control means 13. In Step 58, the database control means 13, after delivering the data received from the update means 18 to the transmission means 12 as a processing result, goes forward to Step 41 which is the initial state.

Figure 10:
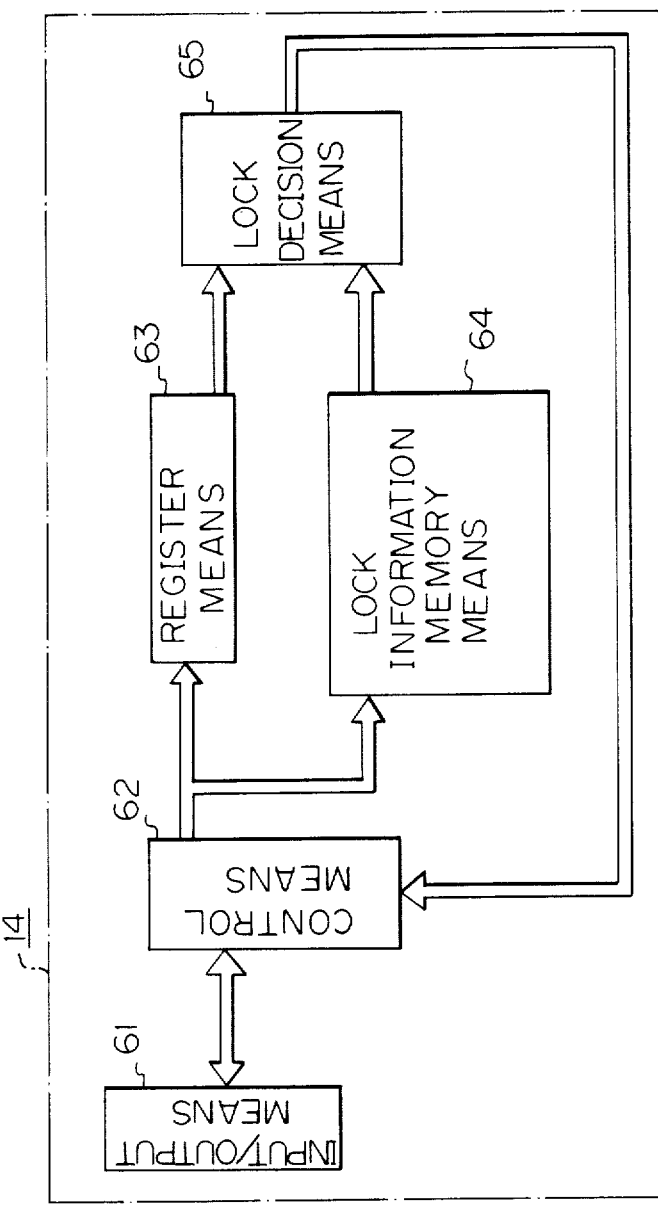
FIG. 10 is a block diagram showing the arrangement of a lock means of the database processing device of the present invention.

The arrangement of the lock means 14 will be described below with reference to the block diagram shown in FIG. 10.

The lock means 14 has input/output means 61 for receiving and/or delivering data from and/or to the database control means 13 (not shown). Control means 62 receives and/or delivers data from and/or to the input/output means 61, and controls processing execution in conformity with entered instruction information. Register means 63 temporarily stores the data supplied from the control means 62. Lock information memory means 64 stores lock information for every record designated by the record designation information, i.e., information on whether the record is locked in the shared mode or exclusive mode. Lock decision means 65 compares instruction information included in data received from the register means 63 with lock information of the record received from the lock information memory means 64 for thereby deciding for and against any lock. In the decision, when the lock information indicates the fact that the record is locked in neither the shared nor the exclusive mode, a lock is enabled; when the lock information is indicative of the fact that the record is locked in the shared mode, a lock is enabled only when instruction information instructs the lock to be effected in the shared mode, and furthermore, when the lock information is indicative of the fact that the record is locked in the exclusive mode, the lock is disabled. The lock decision means 65 delivers the information including the propriety of any lock being the decision result to the control means 62.

Successively, a processing procedure by the control means 62 will be described with reference to FIG. 11. The control means 62 supervises the input/output means 61 while deciding whether or not data is received as shown in Step 71, and goes forward upon reception of the data.

In Step 72, the control means 62 inspects instruction information included in the received data, and if the instruction information is lock instruction information, goes forward to Step 73, while if lock release information, goes forward to Step 78.

In Step 73, the control means 62, after temporarily storing the received data in register means 63, supplies it to the lock decision means 65, while delivering record designation information included in the received data to lock information memory means 64, and reads out lock information of a record corresponding to the record designation information, and after delivering the read out data to the lock decision means 65, goes forward to Step 74. It receives data including information indicative of lock propriety decided by the lock decision means 65. In Step 75, it decides whether or not the received data in Step 74 includes lock enable information, and if it includes such information, goes forward to Step 76, and if not goes forward to Step 80.

In Step 76, the control means 62, after storing record lock information in the lock memory means 64 in conformity with the record designation information, goes forward to Step 77. In Step 77, it delivers data including the lock enable information to the input/output means 61.

In Step 78, the control means 62 deletes the lock information stored in the lock information memory means 64 in conformity with the record designation information in the received data. In Step 79, it delivers data including information indicative of lock release to the input/output means 61.

In Step 80, the control means 62 delivers data including lock disable information to the input/output menas 61.

Figure 12:
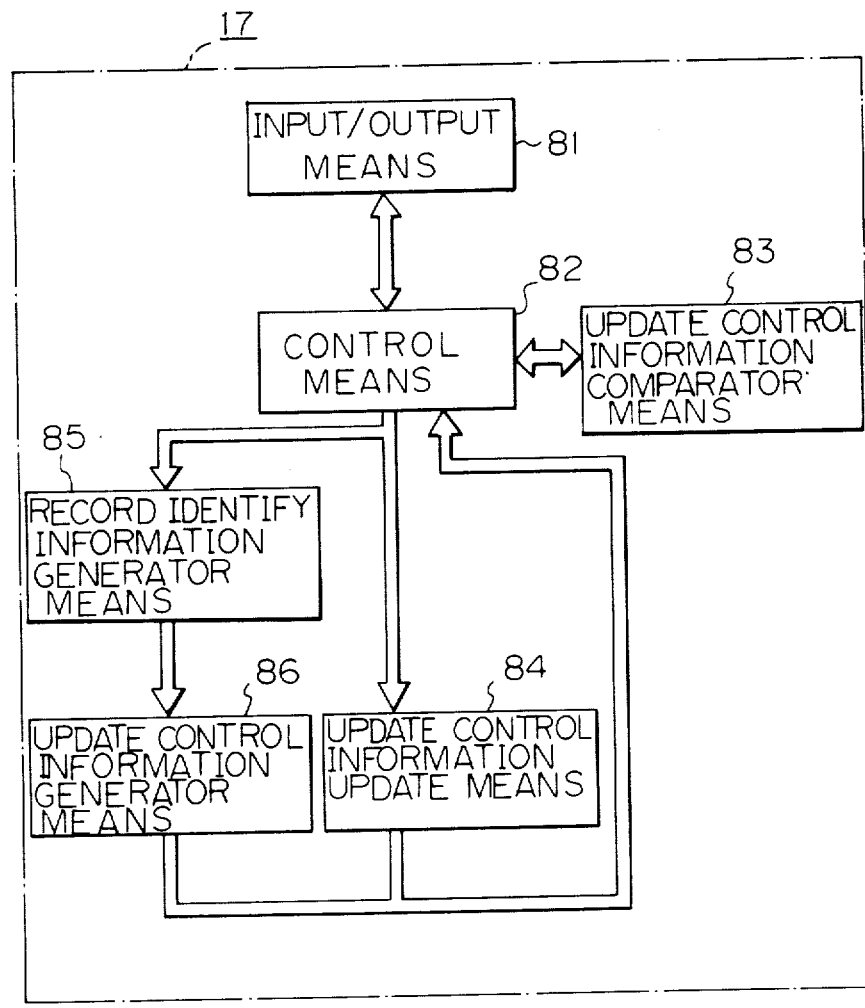
FIG. 12 is a block diagram showing the arrangement of a concurrent execution control means of the database processing device of the present invention.

In succession, the arrangement of the concurrent execution control means 17 will be described using the block diagram of FIG. 12 and the flow chart of FIG. 13.

The concurrent execution control means 17 has a input/output means 81 for receiving and/or delivering data from and/or to the database control means 13 (not shown). Control means 82 receives and/or delivers data from the the input/output means 81 (Step 90 of FIG. 13), and controls processing execution in accordance with entered instruction information. The control means 82, upon entering update instruction information therein (Step 91 FIG. 13), delivers the received data to update control information comparator means 83 (Step 92 of FIG. 13). The received data includes therein both of update control information data involved in a update request received from the terminal and of update control information data stored in a record, the record being stored in a database and designated by record designation information involved in the former data. The update control information comparator means 83 compares update control information respectively included in both data, and delivers data including data indicative of a match or a non-match to the control means 82. Moreover, the control means 82, when information is included which is indicative of a non-match between the data received from the update control information comparator means 83 (Step 94 of FIG. 13), delivers data including information indicative of update cancel (Step 97 of FIG. 13), and furthermore when information is included which is indicative of a match in the received data (Step 94 of FIG. 13), delivers the data received from the terminal unit to the update control information update means 84 (Step 95 of FIG. 13). The update control information update means 84 updates update control information in the received data, for example by adding 1 to a update control information value, and delivers data updated in the update control information to the input/out means 11 via the control means 82 (Step 96 of FIG. 13). Moreover, the control means 82, upon entering record addition instruction information (Step 91 of FIG. 13), supplies the received data to the record identification information generator means 85 (Step 98 of FIG. 13). The record identification information generator means 85 generates record identify information which is different from the record identification information already generated, and delivers the record identification information to update the control information generator means 86. The update control information generator means 86 generates update control information on a record to be newly generated, for example, provides an initial value 0 to the update control information, and delivers the generated update control information together with the recieved record identification information to the control means 82.

Figure 13A:
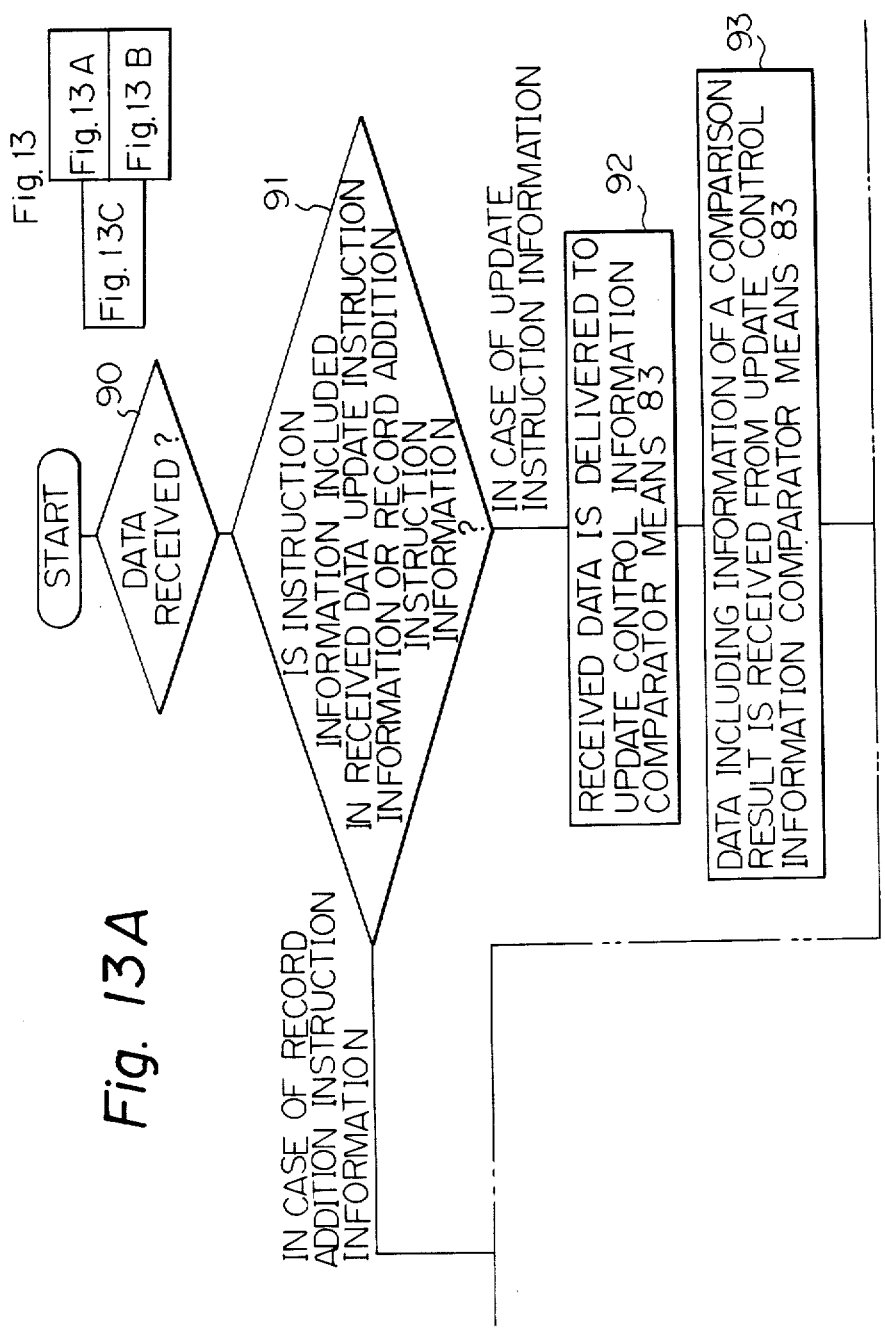
FIG. 13 (consisting of FIGS. 13A, 13B and 13C) is a flow chart illustrating a control procedure by a control means of the concurrent execution control means.
Figure 13B:
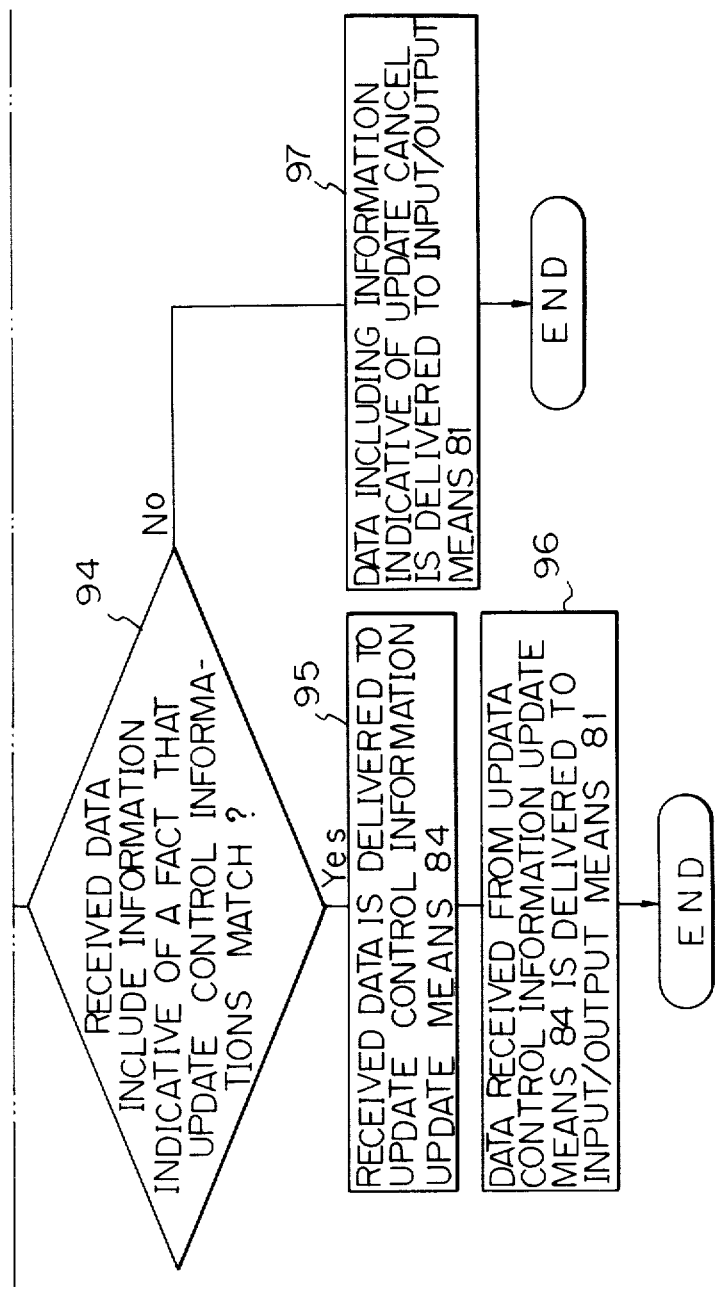
Figure 13C:
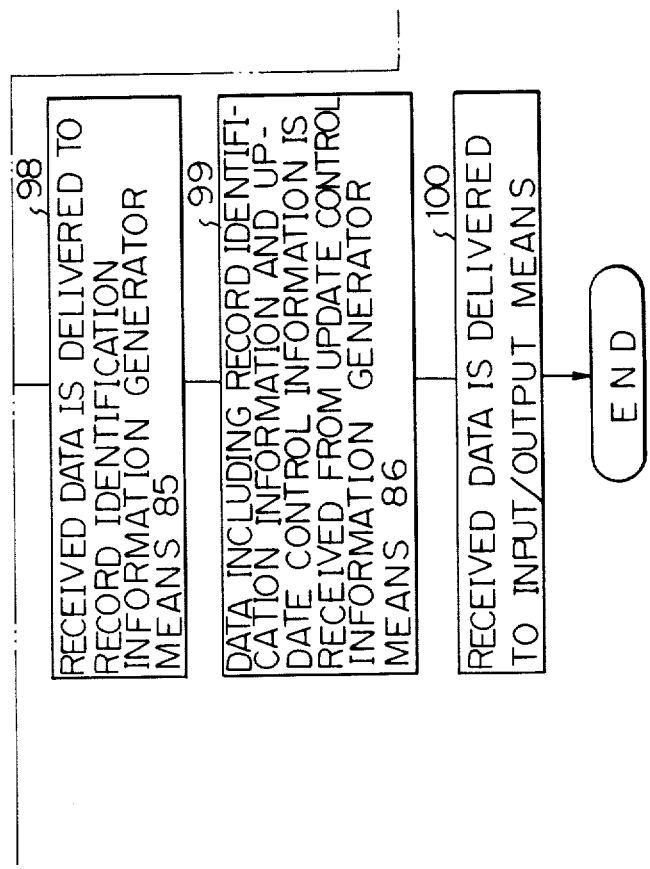

The control means 82 receives data including the record identification information and update control information from the update control information generator means 86 (Step 99 of FIG. 13), and delivers the received data to the input/output means 81 (Step 100 of FIG. 13).

Figure 14:
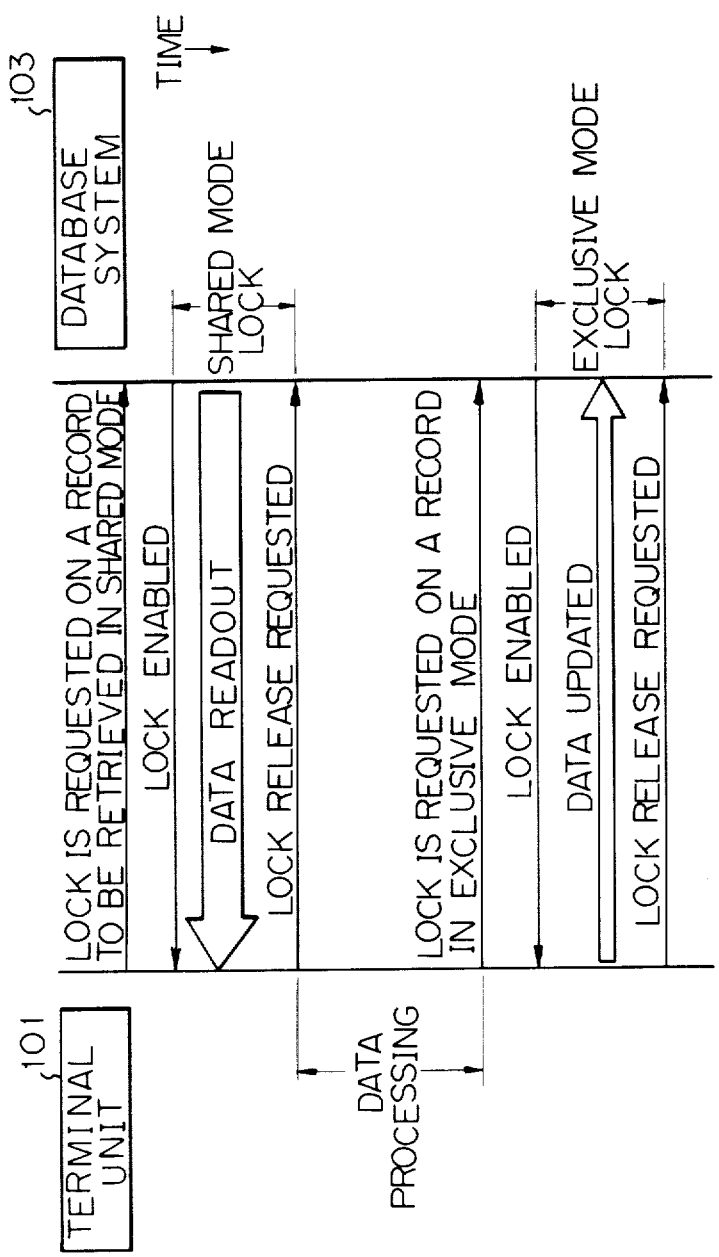
FIG. 14 is a schematic illustrating a processing procedure of a database system using the database of the present invention.

A processing procedure for concurrently processing a database system using the database processing device of the present invention will be described below with reference to FIG. 14.

First, the terminal 101 delivers record designation information and lock instruction information in the shared mode to the database system 103, and requests the database system 103 to lock a record designated by the record designation information. The database system 103 decides for this request the propriety of a lock, and, if lockable, locks the record designated by the record designation information in the shared mode and deliver lock enable information to the terminal 101.

Then, the terminal 101 delivers record designation information and retrieval instruction information to the database system 103, and reads out data including update control information from the database system 103. The terminal 101 further delivers the record designation information and lock release instruction information to the database system 103, and requests the database system 103 to release the lock. For this, the database system 103 releases the lock on a record designated by the record designation information in the shared mode to eliminate the restriction thereon by the terminal 101.

The terminal 101 executes various types of processing for the readout data, and if there is produced the need to correct or alter data stored in the database system 103, delivers record designation information and lock instruction information in the exclusive mode to the system 103 to request the system 103 to lock a record designated by the record designation information in the exclusive mode. For this, the database system 103 decides the propriety of a lock, and if the lock is enabled, locks the record designated by the record designation information in the exclusive mode and delivers lock enable information.

In succession, the terminal 101 delivers data including the record designation information, update instruction information, update control information, and update data to the database system 103. The database system 103 compares the update control information of the data stored in the record designated by the record designation information of the received data with the update data included in the received data. The database system 103, unless the compared results match, decides that the data has been already updated by another terminal, and executes update cancellation processing, while, if there is a match, updates the data based on the update data. The terminal 101, after the update processing or update cancellation processing is completed, delivers the record designation information and the lock release instruction information to the database system 103, and releases the lock of the record.

With the database system including the database processing device according to the present invention, as described above, a certain terminal unit, upon executing update processing, retrieves and reads out data stored in a record, and confirms that the data has not been updated by other terminal units before the data is updated. Accordingly, the time required to lock the record in the shared mode can be shortened.

In addition, a plurality of records may be designated by record designation information and processed in conformity with instruction information.

Although a certain preferred embodiment has been shown and described, it should be understood that many changes and modifications may be made therein without departing from the scope of the appended claims.

What is claimed is:

1. A database processing device for receiving data and for processing stored data; said received data including instruction information and record designation information; said received data being received from a plurality of independent terminal units; and said stored data being in a record in a database designated by said record designation information; said database processing device comprising:

(a) a transmission means for receiving or transmitting data from or to said terminal units;

(b) a database control means for receiving said received data from said transmission means, and for controlling execution of said processing in conformity with said instruction information included in said received data, and for delivering processed data resulting from said processing to said transmission means;

(c) a retrieval means for retrieving said stored data in said record designated by said record designation information included in said received data, and for delivering said stored data stored in said record including update control information stored in said record;

(d) an update means for changing said record designated by said record designation information included in said received data to a data value of said received data, and for updating said update control information of said record, and for delivering data including information indicative of completion of said changing and updating;

(e) wherein said database is accessed by said retrieval means and said update means and wherein said database includes a plurality of records each having data stored therein;

(f) a concurrent execution control means for receiving said update control information data included in said record subjected to said updating by said update means and designated by said record designation information included in said received data, and for receiving said update control information data received by said record update means, and for comparing each of said update control information, wherein said concurrent execution control means delivers data, after updating said update control information included in said record to be updated when said compared update control information match, said delivered data having the updated control information, and wherein said concurrent execution control means delivers data including information indicative of deletion of said update when said compared update control information do not match, and wherein said update means, upon receiving data including information indicative of said deletion of said update, executes said update deletion, and delivers data including information indicative of completion of said update deletion;

wherein said database control means transmits said data received from said tranmission means to said retrieval means when said instruction information included in said data is retrieval instruction infomration, and provides data received from said retrieval means as a processed result, and wherein said database control means delivers said data received from said transmission means to said retrieval means when said instruction information of said data is update instruction information and further delivers said data received from said retrieval means and said data received from said transmission means to said concurrent execution control means, and wherein said database control means transmits said data received from said concurrent execution control means to said update means and employs said data received from said update means a a processed data.

2. A database processing device according to claim 1, wherein said database processing device further comprises a lock means for deciding propriety of a lock on a record designated by said record designation information included in said received data, said lock means storing, when said lock is enabled, a fact that said designated record is locked, and delivering data including lock enable information, on the contrary delivering, when said lock is disabled, data including lock disable information, and said database control means delivering, when said instruction information included in said data received from said transmission means is lock instruction information, said lock instruction information to said lock means, and employing said data received from said lock means as a processed result.

3. A database processing device according to claim 2, wherein said lock means is for executing a lock on a record in a shared mode and a lock on a record in an exclusive mode in conformity with input lock instruction information having two modes of said shared and exclusive modes.

4. A database processing device according to claim 1, wherein said concurrent execution control means further includes record identification information generator means for generating record identification information based on reception of data including record addition instruction information and update control information generator means for generating said update control information, said database control means, when the instruction information included in the data received from said transmission means is said record addition instruction information, delivering said received data from said transmission means to said concurrent execution control means, delivering the data including the record identification information received from said concurrent execution control means and the update control information to said update means, and providing data including information indicative of completion of record addition received from said update means as a processed result.

* * * * *